US007421238B2

(12) United States Patent
Lee et al.

(10) Patent No.: US 7,421,238 B2
(45) Date of Patent: Sep. 2, 2008

(54) USED DEVELOPER CLEANING SYSTEM AND IMAGE FORMING APPARATUS HAVING THE SAME

(75) Inventors: Jun-Hee Lee, Suwon-si (KR); Eun-Sang Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 291 days.

(21) Appl. No.: 11/244,147

(22) Filed: Oct. 6, 2005

(65) Prior Publication Data

US 2006/0083563 A1 Apr. 20, 2006

(30) Foreign Application Priority Data

Oct. 14, 2004 (KR) ...................... 10-2004-0082369
Oct. 15, 2004 (KR) ...................... 10-2004-0082631

(51) Int. Cl.
*G03G 21/00* (2006.01)
*G03G 21/10* (2006.01)

(52) U.S. Cl. ........................ 399/348; 399/358; 399/360

(58) Field of Classification Search ................. 399/101, 399/249, 250, 348, 358, 360
See application file for complete search history.

(56) References Cited

U.S. PATENT DOCUMENTS 3,991,709 A * 11/1976 Sato et al. ................... 399/348
4,799,452 A 1/1989 Day
5,634,170 A * 5/1997 Knapp et al. ................ 399/348

FOREIGN PATENT DOCUMENTS

| | | |
|---|---|---|
| JP | 05-265357 | 10/1993 |
| JP | 2001-051572 | 2/2001 |
| JP | 2002-296995 | 10/2002 |
| JP | 2003-316164 | 11/2003 |
| KR | 100311006 | 9/2001 |

* cited by examiner

*Primary Examiner*—William J Royer
(74) *Attorney, Agent, or Firm*—Roylance, Abrams, Berdo & Goodman, L.L.P.

(57) ABSTRACT

A used developer cleaning system is provided which removes used developer remaining on an image transmission medium after a developer image has been transferred, and an image forming apparatus having such a used developer cleaning system. The used developer cleaning system includes a cleaning section, a used developer collecting section, a first sludge filtering section, positioned in the used developer collecting section to divide the used developer collecting section into at least two spaces, and a used developer storage section for storing the used developer, from which sludge has been filtered through the first sludge filtering section. The used developer storage section communicates with the used developer collecting section.

27 Claims, 6 Drawing Sheets

USED DEVELOPER CLEANING SYSTEM AND IMAGE FORMING APPARATUS HAVING THE SAME

CROSS-REFERENCE TO RELATED APPLICATIONS

This application claims the benefit under 35 U.S.C.§ 119 (a) of Korean Patent Application No. 2004-82369, filed Oct. 14, 2004, and Korean Patent Application No. 2004-82631, filed Oct. 15, 2004, the entire disclosures of which are hereby incorporated by reference.

BACKGROUND OF THE INVENTION

1. Field of the Invention

The present invention relates to an image forming apparatus such as a wet type electrophotographic printer. More particularly, the present invention relates to a used developer cleaning system for cleaning used developer remaining on an image transfer medium such as an image transfer belt or a photoconductor after a developer image has been transferred, and an image forming apparatus having the same.

2. Description of the Related Art

In general, image forming apparatuses form an electrostatic latent image on a photosensitive belt or a photosensitive drum, develop the electrostatic latent image using one or more developers which each have a predetermined color, and then transfer the developed image to a recording medium such as paper. Thus, -a desired image is obtained. Electrophotographic image forming apparatuses are typically classified into wet and dry types depending on the kinds of developers used in the image forming apparatuses. For example, a wet type image forming apparatus uses liquid developer formed by mixing powdered toner with a volatile liquid carrier.

FIG. 1 shows a conventional wet type electrophotographic color printer using liquid developer.

As shown in FIG. 1, the wet type electrophotographic color printer 1 comprises an image forming unit 5, a transfer belt unit 10, a fixing unit 24, a paper-discharge unit 30, and a used developer cleaning unit 50.

The image forming unit 5 comprises four laser scanning units 11, four charge rollers 12, four photoconductors 9, and four developing devices 13 in order to form images of four colors, for example, black, yellow, cyan and magenta images.

Each developing device 13 comprises a developer reservoir 6, a developing roller 7, a deposit roller 14, a metering roller 15, and a cleaning roller 16. The developer reservoir 6 stores liquid developer 48. The developing roller 7 is positioned below a corresponding photoconductor 9. The deposit roller 14 is located below the developing roller 7 and applies an electric charge to the liquid developer 48, thereby forming an electrically charged developer film on the developing roller 7. The metering roller 15 regulates the developer film to contain a predetermined quantity of toner or concentration (% solid). Meanwhile, a predetermined level of voltage is applied to the electrically charged developer film formed on the developing roller 7 through the deposit roller 14 and supplies the electrically charged developer into a nip between the developing roller 7 and the corresponding photoconductor 9. The cleaning roller 16 cleans the developing roller 7.

The deposit roller 14 and the metering roller 15 serve to feed a developer film having a predetermined quantity of toner to the nip between the developing roller 7 and the photoconductor 9 irregardless of the concentration of liquid developer in a concentration range of about 3-40 solid %.

Each photoconductor 9 comprises a photosensitive drum and the corresponding developing device 13 forms a developer image on the photoconductor 9, the color of which is different from a developer image formed on any other photoconductor 9.

The transfer belt unit 10 comprises first transfer rollers 8, a second transfer roller 23, and an image transfer belt 17. The image transfer belt 17 is rotated along an endless track enclosing first, second and third support rollers 19, 20, 21 by a belt driving roller 22. The first transfer rollers 8 each transfer a developer image formed on a corresponding photoconductor 9 to the image transfer belt 17. The second transfer roller 23 transfers the developer image transferred to the image transfer belt 17 to a recording medium P.

The fixing unit 24 comprises first and second heating rollers 25, 27 and first and second compressing rollers 26, 28. The first and second heating rollers 25, 27 heat the developer image transferred to the recording medium P, and the first and second compressing rollers 26, 28 compress the recording medium P against the first and second heating rollers 25, 27 with a constant pressure. An image is fixed on the recording medium P by heat and pressure exerted by the first and second heating rollers 25, 27 and the first and second compressing rollers 26, 28. Then, the recording medium P is discharged out of the printer via the paper discharge unit 30 by first and second paper-discharge rollers 31, 32 and first and second paper-discharge backup rollers 33, 34.

The used developer cleaning unit 50 comprises a cleaning blade 51 for removing used developer 54 remaining on the image transfer belt 17, a used developer gutter 63 for collecting the used developer 54 removed by the cleaning blade 51, and a used developer bin 40 for storing the used developer 54 collected by the used developer gutter 63. The used developer bin 40 is typically communicated with the used developer gutter 63 via a connection tube 66.

The wet type electrophotographic color printer 1 configured as described above is operated in the following manner.

First, as a print command is issued, the image forming unit 5 operates its individual components to perform a series of image forming operations for forming an image of four colors.

Specifically, each photoconductor 9 is formed with a layer of electric charges corresponding to a color image to be printed, for example, an electrostatic image, by a corresponding charge roller 12 and a corresponding scanning unit 11. Additionally, toner of a developer film formed on a corresponding developing roller 7 from the liquid developer 48 of a corresponding reservoir 6 by a corresponding deposit roller 14 and a corresponding metering roller 15 is deposited to the area formed with the electrostatic image to form a developer image, wherein the developer film contains a predetermined quantity of toner.

At this time, the liquid developer 48 is formed as an electrically charged developer film on the developing roller 7 by an electric charge applied by the deposit roller 14 and the electrically charged developer film is transformed into a developer film containing a predetermined quantity of toner on the developing roller 7. Further, the metering roller 15 applies a predetermined level of voltage to the electrically charged developer film.

Each developer image developed on each photoconductor 9 by a corresponding developing device 13 is primarily transferred to the image transfer belt 17 from the photoconductor 9 by voltage and pressure applied and exerted by a corresponding first transfer roller 8 positioned on the inside of the image transfer belt 17. As the image transfer belt 17 is rotated along the first, second and third support rollers 19, 20, 21 by the belt driving roller 22, the developer image is transferred to the image transfer belt 17 and is moved to the second transfer roller 23. Next, the developer image is transferred to a recording medium P by the voltage and pressure applied and exerted by the second transfer roller 23.

The developer image transferred to the recording medium P is fixed to the recording medium P by the first and second heating rollers 25, 27 and the first and second compressing rollers 26, 28. Thus, a desired image is formed.

Thereafter, the recording medium P is discharged out of the paper discharge unit 30 of the printer 1 via the first and second paper-discharge rollers 31, 32 and the first and second paper-discharge backup rollers 33, 34.

After the developer image has been transferred to the recording medium P, the image transfer belt 17 continuously rotates and moves the cleaning blade 51 mounted on one side of the third support roller 21 into contact with the image forming side of the image transfer belt 17. The used developer 54 remaining on the surface of the image transfer belt 17 (typically, not 100% but 90-95% of developer is transferred to a recording medium) is removed from the image transfer belt 17 by the cleaning blade 51 for the purpose of printing a next image, collected into the used developer gutter 63, and then retrieved into the used developer bin 40.

The image transfer belt 17, from which the used developer 54 has been removed, repeats the above-mentioned operations in order to form a next image again through the individual photoconductors 9, laser scanning units 11 and developing devices 13.

The conventional printer 1, configured as described above, stores the used developer 54 removed by the cleaning blade 51 not in the used developer gutter 63 but in the used developer bin 40 which communicates with the used developer gutter 63 via the connection tube 66. Thus, leakage of the used developer 54 which causes pollution is prevented.

However, since the used developer 54 is formed from, for example, liquid containing toner sludge, a problem may arise in that the connection tube 66, which interconnects the used developer gutter 63 and the used developer bin 40, may clog due to the sludge if the used developer 54 collected in the used developer gutter 63 by the cleaning blade 51 is sent to the used developer bin 40 without being filtered.

If the connection tube 66 were clogged, the used developer 54 is continuously collected in the used developer gutter 63. Consequently, the used developer 54 may overflow from the used developer gutter 63 or leak out when the image forming unit 5 or the like is replaced. If the used developer 54 overflows or leaks from the used developer gutter 63, a problem will arise in that the peripheral components such as the transfer belt unit 10 or the like is contaminated. This may reduce the life span of such components.

In order to address these problems, the conventional printer 1 is provided with a sludge filtering screen 65 within the used developer gutter 63 as shown in FIG. 2.

The sludge filtering screen 65 is formed from a grid like metallic or plastic mesh. The sludge filtering screen 65 separates the used developer 54 collected in the used developer gutter 63 by the cleaning blade 51 into for example, particulate sludge and sends only, for example, Norpar/carrier liquid to the used developer bin 40 through the connection tube 66. The particulate sludge filtered by the sludge filtering screen 65 remains in the used developer gutter 63 until the image forming unit 5 serves its time, and the filtered and collected sludge will be disposed along with the image forming unit 5 when the image forming unit 5 is disposed.

However, because such a sludge filtering screen 65 can filter only the sludge having a grain size larger than the mesh of the screen, there is a problem in that particulate sludge having a grain size smaller than the mesh of the screen passes through the sludge filtering screen 65. Accordingly, a problem may still arise in that the small grains of sludge passing through the sludge filtering screen 65 may still render the connection tube 66 clogged.

In addition, there is a problem in that because the sludge filtering screen 65 should be adapted to the shape of the used developer gutter 63, the sludge filtering screen 65 is difficult to mass produce. In addition, because a mold is additionally needed when fabricating such a sludge filtering screen 65, the manufacturing costs thereof are high.

Therefore, what is needed is to provide a used developer cleaning system having a sludge filtering device which can effectively remove sludge contained in used developer 54 and which can be easily fabricated without expending high manufacturing costs.

Accordingly, there is a need for an improved image forming apparatus having a used developer cleaning system with a sludge filtering device which can effectively remove sludge contained in the used developer which can be easily fabricated without expending high manufacturing costs.

SUMMARY OF THE INVENTION

An aspect of the present invention is to solve at least the above problems and/or disadvantages and to provide at least the advantages described below. Accordingly, an aspect of the present invention is to provide a used developer cleaning system which is capable of effectively removing sludge contained in used developer remaining on an image transmission medium such as an image transfer belt or a photoconductor after a developer image has been transferred and an image forming apparatus having such a used developer cleaning system.

In order to achieve the above-mentioned object, there is provided a used developer cleaning system of an image forming apparatus comprising a cleaning section which removes used developer remaining on an image transmission medium, a used developer collecting section which collects the used developer removed by the cleaning section, a first sludge filtering section which filters sludge contained in the used developer and positioned in the used developer collecting section to divide the used developer collecting section into at least two spaces, and a used developer storage section which stores the used developer from which sludge has been filtered through the first sludge filtering section. Further, the used developer storage section communicates with the used developer collecting section.

In a preferred embodiment, the at least two spaces include a first space located at a first position where the used developer removed by the cleaning section drops, and a second space located away from the first position. At this time, it is preferable if a bottom portion of the used developer collecting section positioned in the first space angles toward the second space, and another bottom portion of the used developer collecting section positioned in the second space angles toward a used developer discharge port.

The first sludge filtering section may comprise at least one first porous plate having at least one cell density. At least one first porous plate is formed from a first sponge plate having a predetermined cell density. The predetermined cell density may be in one of the range of about 6 to 10 cells per 25 mm length and the range of about 11 to 16 cells per 25 mm length. The first sponge plate is preferably formed from polyurethane material. Alternatively, the at least one first porous plate may be formed from a third sponge plate having a first cell density, and a fourth sponge plate having a second cell density, which is higher than the first cell density. The first cell density is preferably in the range of about 6 to 10 cells per 25 mm length and the second cell density is preferably in the range of about 11 to 16 cells per 25 mm length. The third and fourth sponge plates are preferably formed from polyurethane material.

In addition, the inventive used developer cleaning system may further comprise a second sludge filtering section which secondarily filters the sludge contained in the used developer primarily filtered through the first sludge filtering section, wherein the second filtering section is located upstream of the used developer discharge port.

The second sludge filtering section may comprise at least one second porous plate, having at least one cell density. The at least one second porous plate is formed from a second sponge plate having a predetermined cell density. The predetermined cell density may be in one of the range of about 6 to 10 cells per 25 mm length and the range of about 11 to 16 cells per 25 mm length, and the second sponge may be formed from polyurethane material. Alternatively, the at least one second porous plate is formed from a third sponge plate having a first cell density, and a fourth sponge plate having a second cell density, which is higher than the first cell density. The first cell density is preferably in the range of about 6 to 10 cells per 25 mm length and the second cell density is preferably in the range of about 11 to 16 cells per 25 mm length. The third and fourth sponge plates are preferably formed from polyurethane material.

The image transmission medium may comprise at least one of a photosensitive drum which forms a developer image using liquid developer, a photosensitive belt which forms a developer image using liquid developer, and an image transfer belt which transfers the developer image formed on the photosensitive drum to a recording medium.

According to another aspect of the present invention, there is provided an image forming apparatus comprising an image forming unit having at least one photoconductor which forms a developer image using liquid developer; a transfer unit having an image transfer belt which transfers the developer image formed on the photoconductor to a recording medium, a fixing unit which fixes the developer image transferred to the recording medium, and a used developer cleaning unit which cleans used developer remaining on the photoconductor after the developer image is transferred to the image transfer belt and/or used developer remaining on the image transfer belt after the developer image is transferred to the recording medium. The used developer cleaning unit comprises a cleaning section which removes used developer remaining on at least one of the photoconductor and the image transfer belt, a used developer collecting section which collects the used developer removed by the cleaning section, a first sludge filtering section which filters sludge contained in the used developer and is positioned in the used developer collecting section to divide the used developer collecting section into at least two spaces. A used developer storage section stores the used developer from which sludge has been filtered through the first sludge filtering section. Further, the used developer storage section communicates with the used developer collecting section.

In a preferred embodiment, the at least two spaces include a first space located at a first position where the used developer removed by the cleaning section drops, and a second space located away from the first position. At this time, a bottom portion of the used developer collecting section positioned in the first space angles toward the second space, and another bottom portion of the used developer collecting section positioned in the second space angles toward a used developer discharge port through which the used developer is discharged to the used developer storage section.

The first sludge filtering section may comprise at least one first porous plate having at least one cell density. In other words, the at least one first porous plate may be formed from a first sponge plate having a predetermined cell density. Alternatively, the at least one first porous plate may comprise a third sponge plate having a first cell density and a fourth sponge plate having a second cell density, which is higher than the first cell density.

In addition, the used developer cleaning unit may further comprise a second sludge filtering section which secondarily filters the sludge contained in the used developer primarily filtered through the first sludge filtering section, and wherein the second filtering section is located upstream of the used developer discharge port.

The second sludge filtering section may comprise at least one second porous plate having at least one cell density equal or higher than that of the at least one first porous plate.

The at least one second porous plate may be formed from a second sponge plate having a predetermined cell density or may comprise a third sponge plate having a first cell density, and a fourth sponge plate having a second cell density, which is higher than the first cell density.

According to another aspect of the present invention, there is provided an image forming apparatus comprising an image forming unit having at least one photosensitive belt which forms a developer image using liquid developer, a transfer unit which transfers the developer image formed on the photosensitive belt to a recording medium, a fixing unit which fixes the developer image transferred to the recording medium, and a used developer cleaning unit which cleans used developer remaining on the photosensitive belt after the developer image is transferred to the recording medium. The used developer cleaning unit comprises a cleaning section which removes used developer remaining on the photosensitive belt, a used developer collecting section which collects the used developer removed by the cleaning section, and a first sludge filtering section which filters sludge contained in the used developer. The first sludge filtering section is positioned in the used developer collecting section to divide the used developer collecting section into at least two spaces. A used developer storage section which stores used developer from which sludge has been filtered through the first sludge filtering section, wherein the used developer storage section communicates with the used developer collecting section.

The at least two spaces may include a first space located at a first position where the used developer removed by the cleaning section drops, and a second space located away from the first position. At this time, it is preferable if a bottom portion of the used developer collecting section positioned in the first space is formed to downwardly decline toward the second space, and another bottom portion of the used developer collecting section positioned in the second space is formed to downwardly decline toward a used developer discharge port, through which the used developer is discharged to the used developer storage section.

In addition, the used developer cleaning unit may further comprise a second sludge filtering section which secondarily filters the sludge contained in the used developer primarily filtered through the first sludge filtering section, wherein the second filtering section is located upstream of the used developer discharge port.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4:
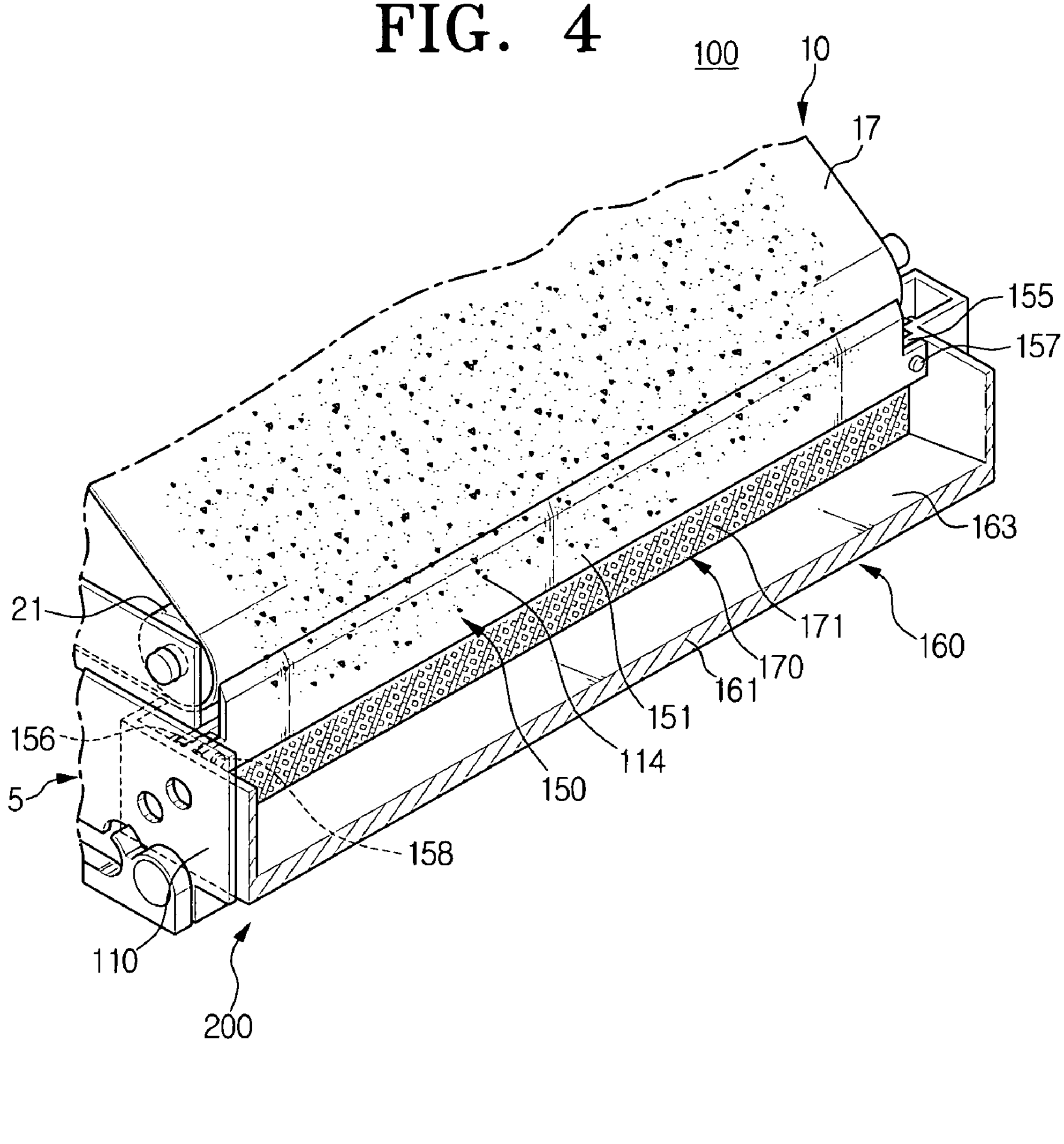
FIG. 4 is a partial perspective view showing an electrophotographic color printer, to which a used developer cleaning system according to an embodiment of the present invention is applied.

FIG. 4 shows a part of an image forming apparatus, to which a used developer cleaning system according to an exemplary embodiment of the present invention is applied.

An example of an image forming apparatus on which the used developer cleaning system can be used, is a wet type electrophotographic color printer 100 which internally processes print data transmitted from a computer or the like (not shown) and performs printing functions.

As shown in FIG. 4, the wet type electrophotographic color printer 100 typically comprises a paper-feeding unit (not shown) for feeding recording mediums such as papers loaded in a paper-feeding cassette (not shown), an image forming unit 5 having four photoconductors (not shown) each forming a developer image using liquid developer, a transfer belt unit 10 having an image transfer belt 17 for sequentially transferring the developer images each formed on respective photoconductors to a recording medium, wherein the image transfer belt 17 constitutes an image transmission medium, a fixing unit (not shown) for fixing the developer images transferred to the recording medium, and a used developer cleaning system 200 for removing used developer 114 remaining on the image transfer belt 17 after the developer images have been transferred to the recording medium.

Figure 1:
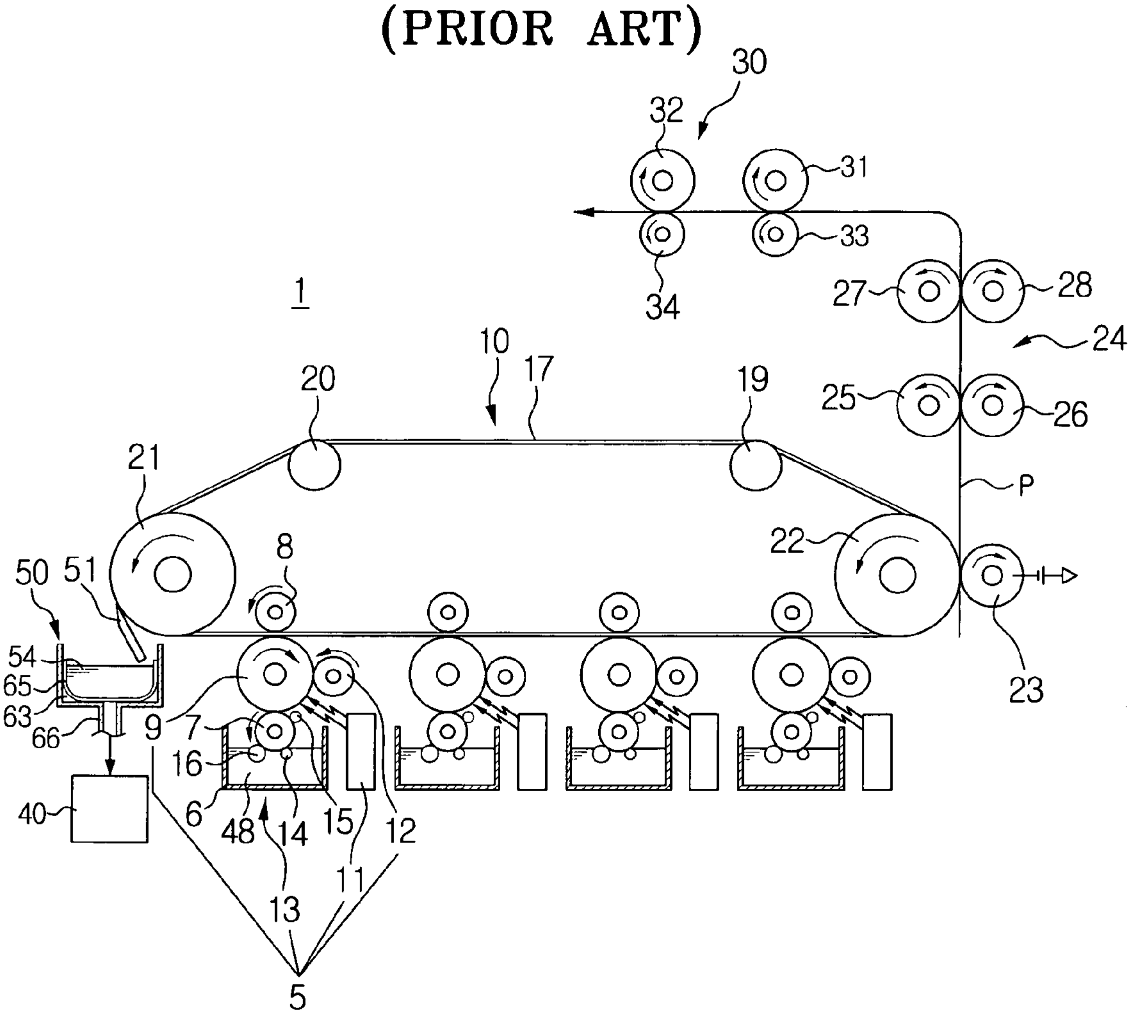
FIG. 1 (PRIOR ART)
FIG. 1 is a schematic view of a conventional wet type electrophotographic color printer.

Except for the used developer cleaning system 200, the construction and operation of the wet type electrophotographic color printer 100 are substantially the same as those of the conventional wet type electrophotographic color printer 1 described above with reference to FIG. 1. Therefore, a description of the well-known functions and constructions thereof will be omitted for clarity and conciseness.

Figure 5:
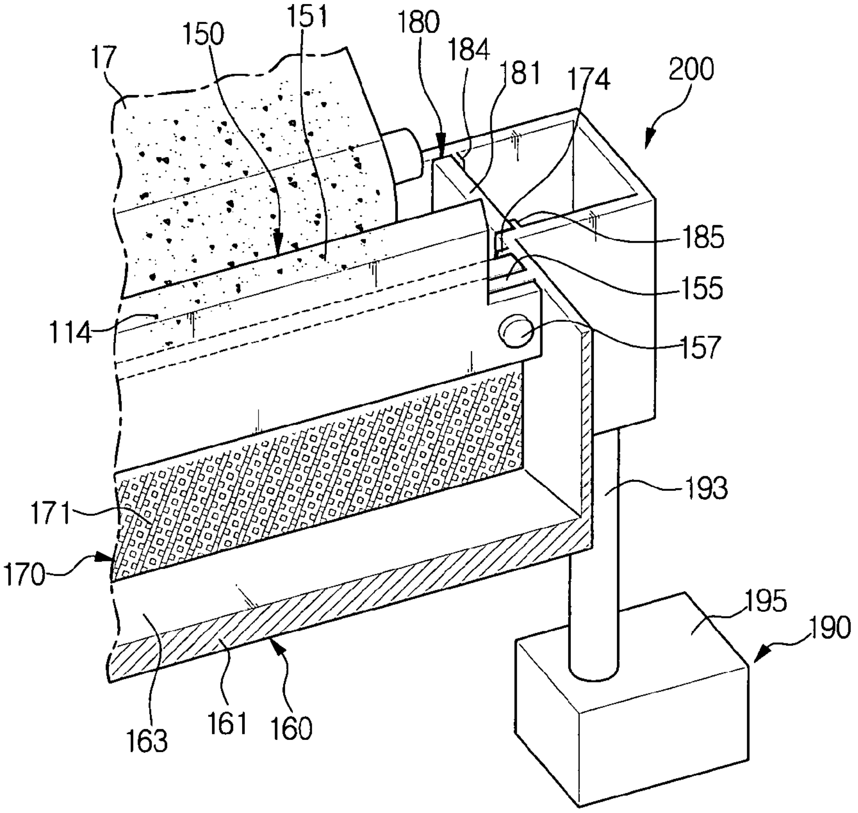
FIG. 5 is a partial perspective view of the used developer cleaning system shown in FIG. 4.

As shown in FIGS. 4 and 5, the used developer cleaning system 200 comprises a cleaning section 150, a used developer collecting section 160, a first sludge filtering section 170, and a used developer storage section 190.

The cleaning section 150 comprises a cleaning blade 151 for removing used developer 114 remaining on the image transfer belt 17. The cleaning blade 151 is preferably located at a lateral and lower side of the-a third support roller 21 and contacts with the image forming surface of the image transfer belt 17 in a direction transverse to the image transfer belt 17. Thus, the cleaning blade 151 scrapes the used developer 114 remaining on the image transfer belt 17. The cleaning blade 151 is fixed at the opposite ends thereof to first and second fixing brackets 155, 156 provided in a used developer gutter 161 of the used developer collecting section 160 by fixing members such as screws 157, 158.

Although the cleaning section 150 is exemplified and described as comprising the cleaning blade 151, the cleaning section 150 alternatively may comprise other cleaning members which can remove developer remaining on the image transfer belt 17, for example, a cleaning roller (not shown) or both of a cleaning blade and a cleaning roller.

The used developer collecting section 160 comprises the used developer gutter 161 for collecting developer scraped and dropped from the image transfer belt 17 by the cleaning blade 151. The used developer gutter 161 has a top-opened rectangular parallelepiped shape, which is fixed to a frame 110 of the image forming unit 5 below the cleaning blade 151.

Figure 6:
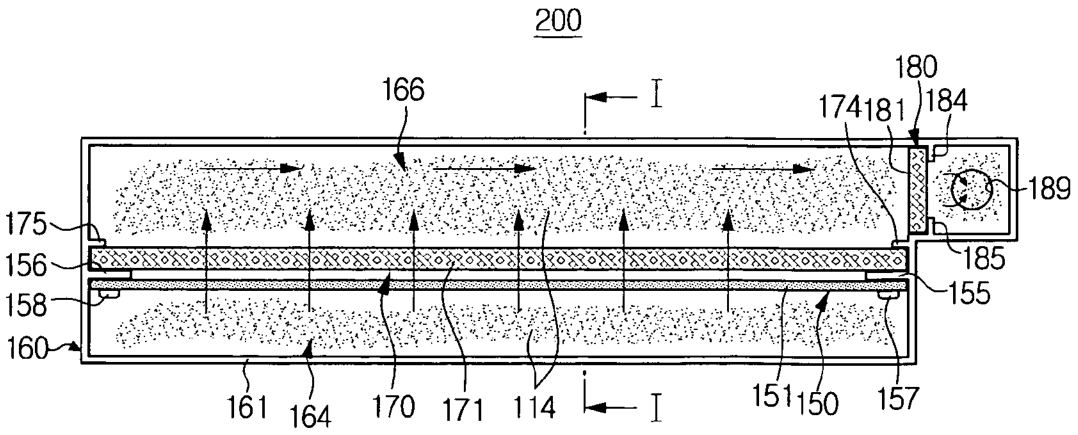
FIG. 6 is a top plan view of the used developer cleaning system shown in FIG. 4.
Figure 7:
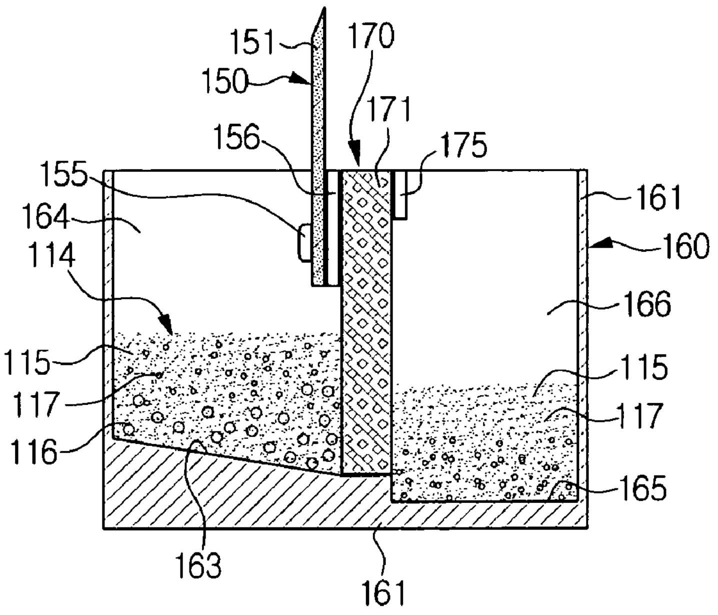
FIG. 7 is a cross-sectional view of a first sludge filtering section of a used sludge filtering system taken along line I-I in FIG. 5.

As shown in FIGS. 6 and 7, the first sludge filtering section 170 comprises a first porous plate member 171 for primarily filtering a first sludge fraction 116 contained in the used developer 114. The first porous plate member 171 is longitudinally positioned in the used developer gutter 161 to divide the used developer gutter 161 of the used developer collecting section 160 into a first space 164 and a second space 166. The opposite ends of the first porous plate member 171 are arranged adjacent to the first and second fixing brackets 155, 156, to which the cleaning blade 151 is fixed, and first and second fixing ridges 174, 175 formed in the used developer gutter 161, respectively, and the opposite ends are fixed to the first and second fixing ridges 174, 175 and a first bottom portion 163 of the used developer gutter 161, by a fixing member such as an adhesive (not shown).

The first porous plate member 171 may be preferably formed from a polyurethane sponge plate (hereinbelow, to be referred as "first sponge plate") such as HR-08 available from BRIDGE STONE CORPORATION™, which has a first cell density in the range of about 6 to 10 cells per 25 mm length. Alternatively, the first porous plate member 171 may comprise a first sponge plate such as HR-13, wherein the HR-13 is also available from BRIDGE STONE CORPORATION™ and has a second cell density, for example, in the range of about 11 to 16 cells per 25 mm length, which is higher than the first cell density.

It is preferable that the first porous plate member 171 has a thickness of about 3 to 30 mm regardless of the cell density of the first sponge plate used for forming the first porous plate member 171.

The first space 164 of the used developer gutter 161 defined by the first porous plate member 171 is located at a first position, where the used developer 114 is removed by the cleaning blade 151 and drops. The second space 166 is located away from the first position. In addition, the first bottom portion 163 of the used developer gutter 161 is positioned in the first space 164 so that it downwardly declines toward the second space 166. A second bottom portion 165 of the used developer gutter 161 is positioned in the second space 166 so as to downwardly decline toward a used developer discharge port 189, through which the used developer 114 is discharged to a used developer bin 195 of the used developer storage section 190.

Therefore, the used developer 114 flows to the used developer gutter 161, due to the angle of the first bottom portion 163, from the first space 164 toward the second space 166, through the first porous plate member 171 in such a way that the first sludge fraction 116 (having a relatively large grain size), among the first sludge fraction 116 and a second sludge fraction 117 and a Norpar/carrier liquid 115 contained in the used developer 114, is naturally filtered. Then, the used developer 114 flows, due to the angle of the second bottom portion 165, toward the discharge port 189 in such a way that the second sludge fraction 117 is naturally filtered through a second porous plate member 181 of a second sludge filtering section 180 in the second space 166, as shown in FIG. 7.

The used developer cleaning system 200 further comprises the second sludge filtering section 180 which secondarily filters the second sludge fraction 117 contained in the used developer 114, as described above.

As shown in FIG. 6, the second sludge filtering section 180 comprises the second porous plate member 181 located upstream of the used developer discharge port 189 in the second space 166 of the used developer gutter 161. The opposite ends of the second porous plate member 181 are fixed to second and fourth fixing ridges 184, 185 formed upstream of the used developer discharge port 189 in the used developer gutter 161 and the second bottom portion 165 of the used developer gutter 161 by fixing members such as adhesive (not shown).

It is preferable to form the second porous plate member 181 using a polyurethane sponge plate (hereinbelow, to be referred as "second sponge plate") having a third cell density which is equal to, or higher than the first cell density or the second cell density. In the present embodiment, the second porous plate member 181 is formed from the second sponge plate such as HR-13, which is available from BRIDGE STONE CORPORATION™ and has the second cell density in the range of about 11 to 16 cells per 25 mm length. Therefore, the second porous plate member 181 filters the second sludge fraction 117 having a relatively small grain size among the first and second sludge fractions 116, 117 and the Norpar/carrier liquid 115 contained in the used developer 114.

The second porous plate member 181 is formed from the second sponge plate having the third cell density which is equal to, or higher than the cell density the first porous plate member 171 because an additional sludge filtering effect cannot be achieved if the second porous plate member 181 which secondary filters is formed from a sponge plate having a cell density lower than that of the first porous plate member 171 as the first sludge fraction 116 of the used developer 114 is primarily filtered by the first porous plate member 171.

The second porous plate member 181 is formed to have a thickness of about 3-30 mm like the first porous plate member 171.

As shown in FIG. 5, the used developer storage section 190 comprises the used developer bin 195 which receives the used developer 114 after the first and second sludge fractions 116, 117 have been filtered from the used developer 114 through the first and second porous plate members 171, 181 of the first and second sludge filtering sections 170, 180. The used developer bin 195 is connected to the used developer discharge port 189 of the used developer gutter 161 through a connection tube 193.

Because the inventive used developer cleaning system 200 is arranged in such a manner that the first and second sludge fractions 116, 117 contained in the used developer 114 are filtered in two steps through the first and second porous plate members 171, 181 having different cell densities from each other, it is possible to improve the effect of removing sludge from the used developer 114 discharged through the used developer discharge port 189. In addition, because the first and second porous plate members 171, 181 are formed from polyurethane sponge plates, they can be fabricated merely by cutting the sponge plates without using a separate mold, whereby the manufacturing costs can be saved.

The inventors performed tests using several testing conditions indicated in Table 1 so as to find the sludge removing efficiency of the inventive used developer cleaning system 200. Through the tests, it has been found that the used developer 114 retrieved into the used developer bin 195 contains only Norpar/carrier liquid 115 without first and second sludge fractions 116, 117.

TABLE 1

| Step | Testing content | Introduced quantity (ml) | Cumulative elapsed time (min) | Filtering condition |
|---|---|---|---|---|
| 1 | Mixing liquid developer (18% solid) and sludge and accumulating them on the first bottom (163) to a thickness of 10 mm | 100 | — | |
| 2 | Introducing liquid developer (6% solid) for five minutes | 50 | 5 | Normal |
| 3 | Introducing liquid developer (18% solid) for five minutes | 100 | 10 | Normal |
| 4 | Standby for ten minutes | — | 20 | Normal |
| 5 | Introducing Norpar for five minutes | 100 | 25 | Normal |
| 6 | Introducing liquid developer (18% solid) for five minutes | 100 | 30 | Normal |
| 7 | Introducing Norpar for twenty minutes | 200 | 50 | Normal |
| 8 | Standby for sixty minutes | — | 110 | Normal |
| 9 | Introducing liquid developer (18% solid) for five minutes | 100 | 115 | Normal |
| 10 | Introducing liquid developer (6% solid) for five minutes | 100 | 120 | Normal |
| 11 | Standby for sixty minutes | — | 180 | Normal |
| 12 | Introducing Norpar for five minutes | 100 | 185 | Normal |
| 13 | Standby for six hundred minutes | — | 785 | Normal |
| 14 | Introducing liquid developer (18% solid) for five minutes | 100 | 790 | Normal |
| 15 | Standby for sixty minutes | — | 850 | Normal |

Figure 8:
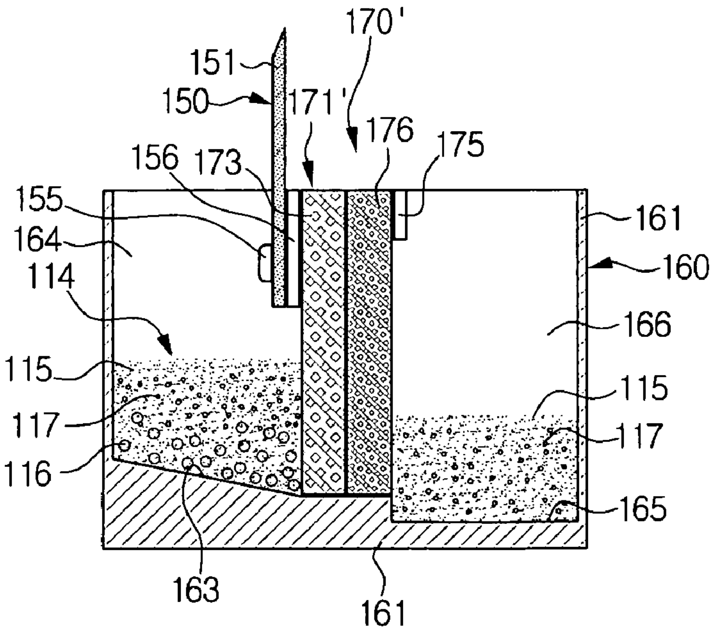
FIG. 8 is a partial cross-sectional view showing another embodiment of the first sludge filtering section shown in FIG. 7.

Although the used developer cleaning system 200 has been exemplified and described above as being arranged in such a way that the first and second sludge filtering sections 170, 180 comprise first and second porous plate members 171, 181, each formed from a single layer of sponge plate, the exemplary embodiments of the present invention is not limited to this. That is, as shown in FIG. 8, the first and second sludge filtering sections (only the first sludge filtering section 170' is shown in the drawing) may respectively comprise first and second porous plate members (only the first porous plate member 171' is shown in the drawing) each formed from two layers of sponge plates, for example, third and fourth sponge plates 173, 176. In this event, the first porous plate member 171' is formed from the third sponge plate 173 of polyurethane material such as HR-08 of BRIDGE STONE CORPORATION™, which has the first cell density, for example, about 6 to 10 cells per 25 mm length, and the fourth sponge plate 176 of polyurethane material such as HR-13 of BRIDGE STONE CORPORATION™, which has the second cell density, for example, about 11 to 16 cells per 25 mm length, and the second porous plate member may formed from two sponge plates, which have cell densities equal to or higher than the cell densities of the third and fourth sponge plates 173, 176, respectively.

In addition, although the inventive used developer cleaning system 200 has been exemplified and described as being applied in such a way that it is mounted below the image transfer belt 17 constructing an image transmission medium to clean the used developer remaining on the image transfer belt 17 after developer images have been transferred to a recording medium, the embodiments of the present invention is not limited to this. For example, the inventive used developer cleaning system 200 may be also applied, with the same principles and constructions, in such a way that it is mounted below a photoconductor constructing the image transmission medium to remove used developer remaining on the photoconductor after a developer image has been transferred to the image transfer belt 17.

Moreover, although the inventive used developer cleaning system 200 has been exemplified and described as being applied to the wet type electrophotographic color printer 100 including a transfer belt unit 10 provided with the image transfer belt 17 for transferring developer images formed on respective photoconductors so as to remove used developer 114 remaining on the image transfer belt 17, the embodiments of the invention are not limited to this and can be applied to other types of wet printers. For example, the inventive used developer cleaning system 200 may be applied, with the same principles and constructions, to remove used developer remaining on a photosensitive belt in a printer (not shown), which employs a photosensitive belt (not shown) in lieu of a photosensitive drum as a photoconductor and which has a fixing unit (not shown) or a transfer/fixing unit (not shown) which directly transfers and fixes a developer image to a recording medium from the photosensitive belt without employing a transfer belt unit 10 including an image transfer belt 17.

Now, the operation of the wet type electrophotographic color printer 100 including the inventive used developer cleaning system 200 configured as described above is described in more detail with reference to FIGS. 4 to 7.

Figure 2:
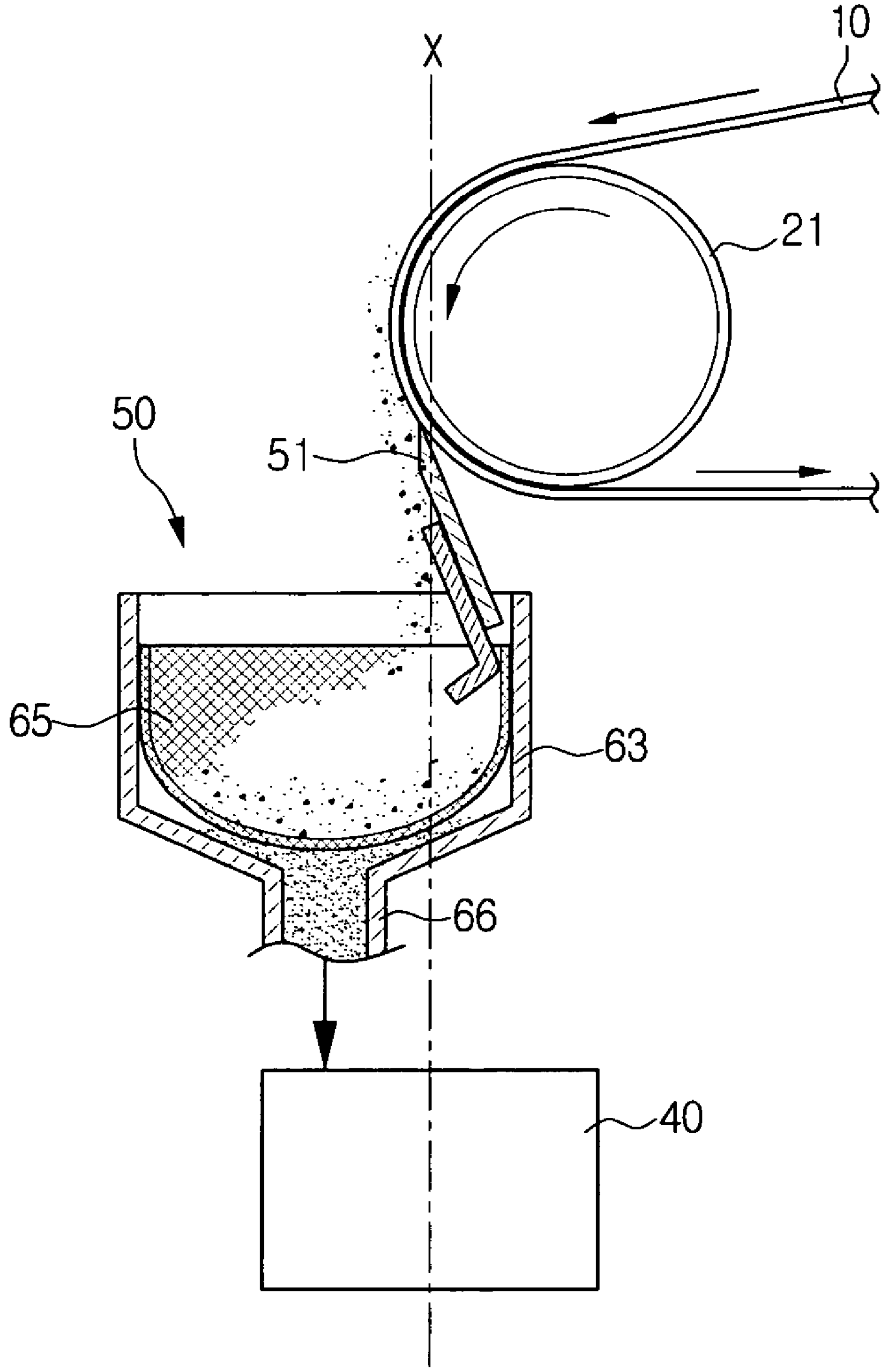
FIG. 2 (PRIOR ART)
FIG. 2 is a partial cross-sectional view exemplifying a used developer cleaning system of the wet type electrophotographic color printer shown in FIG. 1.
Figure 3:
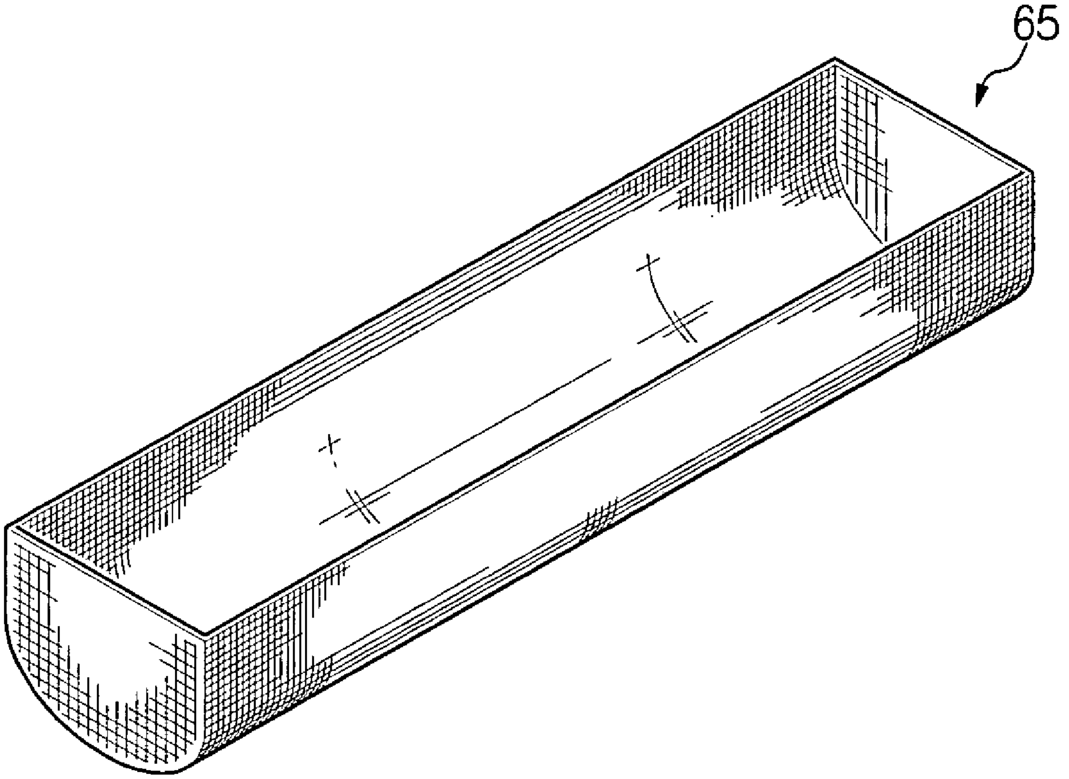
FIG. 3 (PRIOR ART)
FIG. 3 is a perspective view of a sludge filtering screen of a used developer gutter of the used developer cleaning system shown in FIG. 2.

At first, as a print command is issued, the image forming unit 5 operates respective components to form a developer image on each photoconductor and the developer image or developer images formed on one or more such photoconductors are primarily transferred to the image transfer belt 17 from the photoconductors by the first transfer rollers (not shown). Then, the developer image is secondarily transferred to a recording medium from the image transfer belt 17 by the second transfer roller (not shown), like the conventional printer 1 described above with reference to FIGS. 1 and 2.

After the developer images has been transferred to the image transfer belt 17, the image transfer belt 17 is continuously rotated by a belt driving roller (not shown) and moves to the cleaning blade 151 mounted on a side of the third support roller 21 for contacting with the image forming side of the image transfer belt 17.

The cleaning blade 151 scrapes used developer 114 remaining on the surface of the image transfer belt 17 and the used developer 114 scraped by the cleaning blade 151 drops into the used developer gutter 161 via gravitational effects, thereby being collected in the first space 164.

At this time, first and second sludge fractions 116, 117 having relatively high densities and contained in the used developer 114 drop into the first space 164 of the used developer gutter 161 from the image transfer belt 17 and sink down. The Norpar/carrier liquid 115, which has a relatively low density, rises up as shown in FIG. 7. In addition, because the Norpar/carrier liquid 115 which rose up has good fluidity, it moves to the first porous plate member 171 along the first bottom portion 163 of the used developer gutter 161, which downwardly declines toward the second space 166 from the first space 164, more rapidly than the first and second sludge fractions 116, 117.

In the used developer 114, which has arrived at the first porous plate member 171, the Norpar/carrier liquid 115 and second sludge fraction 117 having a grain size smaller than the cells of the first sponge plate of the first porous plate member 171 will easily pass through the first porous plate member 171. The first sludge fraction 116 having a grain size larger than the cells of the first porous plate member 171 is blocked without passing through the first porous plate member 171.

Thereafter, the Norpar/carrier liquid 115 and second sludge fraction 117 pass through the first porous plate member 171 and move to the second porous plate member 181 along the second bottom portion 165 which downwardly declines toward the used developer discharge port 189.

After having arrived at the second porous plate member 181, the second sludge fraction 117 having a grain size larger than the cells of the second porous plate member 181 is filtered again by the second porous plate member 181, and the Norpar/carrier liquid 115 having a grain size smaller than the cells of the second porous plate member 181 passes through the second porous plate member 181 and moves to the used developer discharge port 189.

Thereafter, the Norpar/carrier liquid 115, which has arrived at the used developer discharge port 189, is retrieved into the used developer bin 195 through the connection tube 193. At this time, the Norpar/carrier liquid 115 moves to the used developer bin 195 without causing the used developer discharge port 189 and the connection tube 193 to be clogged because the first and second sludge fractions 116, 117 have been removed.

The recording medium, to which the developer images have transferred, will be discharged out of the printer by the paper-discharge unit after the developer images are fixed.

As described above, according to the exemplary embodiments of the present invention, sludge contained in used developer is filtered through first and/or second porous plate members, wherein the porous members have same or different cell densities from each other. Therefore, there is provided an effect of improving the efficiency of removing sludge from used developer to be discharged through a used developer discharge port.

In addition, according to the embodiments of the present invention, first and second porous plate members which filter sludge contained in used developer is formed from a polyurethane sponge plate. Therefore, it is possible to achieve effects of easily fabricating porous members and saving the manufacturing costs thereof.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A used developer cleaning system of an image forming apparatus comprising:

a cleaning section which removes used developer remaining on an image transmission medium;

a used developer collecting section which collects the used developer removed by the cleaning section;

a first sludge filtering section which filters sludge contained in the used developer, wherein the first sludge filtering section is positioned in the used developer collecting section so as to divide the used developer collecting section into at least two spaces; and a used developer storage section which stores the used developer, from which sludge has been filtered through the first sludge filtering section, wherein the used developer storage section communicates with the used sludge collecting section;

wherein the first sludge filtering section comprises at least one first porous plate having at least one cell density.

2. The used developer cleaning system as claimed in claim 1, wherein the at least two spaces include a first space located at a first position where the used developer removed by the cleaning section drops, and a second space located away from the first position at a second position.

3. The used developer cleaning system as claimed in claim 2, wherein:

a bottom portion of the used developer collecting section positioned in the first space angles toward the second spaces; and another bottom portion of the used developer collecting section positioned in the second space angles toward a used developer discharge port.

4. The used developer cleaning system as claimed in claim 1, wherein the at least one first porous plate is formed from a first sponge plate having a predetermined cell density.

5. The used developer cleaning system as claimed in claim 4, wherein:

the predetermined cell density is in one of the range of about 6 to 10 cells per 25 mm length and the range of about 11 to 16 cells per 25 mm length; and the first sponge plate is formed from polyurethane material.

6. The used developer cleaning system as claimed in claim 1, wherein the at least one first porous plate comprises:

a second sponge plate having a first cell density; and a third sponge plate having a second cell density, which is higher than the first cell density.

7. The used developer cleaning system as claimed in claim 6, wherein:

the first cell density and the second cell density are respectively in the range of about 6 to 10 cells and 11 to 16 cells per 25 mm, respectively; and the second and third sponge plates are respectively formed from polyurethane material.

8. The used developer cleaning system as claimed in claim 1, further comprising a second sludge filtering section which secondarily filters the sludge contained in the used developer primarily filtered through the first sludge filtering section, wherein the second sludge filtering section is located upstream of the used developer discharge port.

9. The used developer cleaning system as claimed in claim 8, wherein:

the second sludge filtering section comprises at least one second porous plate having at least one cell density; and the at least one cell density of the at least one second porous plate is equal to or higher than the at least one cell density of the at least one first porous plate.

10. The used developer cleaning system as claimed in claim 9, wherein the at least one second porous plate is formed from a sponge plate having a predetermined cell density.

11. The used developer cleaning system as claimed in claim 10, wherein:

the predetermined cell density is in one of the range of about 6 to 10 cells per 25 mm length and the range of about 11 to 16 cells per 25 mm length; and the sponge plate is formed from polyurethane material.

12. The used developer cleaning system as claimed in claim 9, wherein the at least one second porous plate comprises:

a second sponge plate having a first cell density; and a third sponge plate having a second cell density, which is higher than the first cell density.

13. The used developer cleaning system as claimed in claim 12, wherein:

the first cell density and the second cell density are respectively in the range of about 6 to 10 cells and 11 to 16 cells per 25 mm, respectively; and the second and third sponge plates are respectively formed from polyurethane material.

14. The used developer cleaning system as claimed in claim 1, wherein the image transmission medium comprises at least one of a photosensitive drum which forms a developer image using liquid developer, a photosensitive belt which forms a developer image using liquid developer, and an image transfer belt which transfers the developer image formed on the photosensitive drum to a recording medium.

15. An image forming apparatus comprising:

an image forming unit having at least one photoconductor which forms a developer image using liquid developer;

a transfer unit having an image transfer belt which transfers the developer image formed on the photoconductor to a recording medium;

a fixing unit which fixes the developer image transferred to the recording medium; and a used developer cleaning unit which cleans used developer remaining on the photoconductor after the developer image is transferred to the image transfer belt and/or used developer remaining on the image transfer belt after the developer image is transferred to the recording medium, wherein the used developer cleaning unit comprises:

a cleaning section which removes used developer remaining on at least one of the photoconductor and the image transfer belt;

a used developer collecting section which collects the used developer removed by the cleaning section;

a first sludge filtering section which filters sludge contained in the used developer, wherein the first sludge filtering section is positioned in the used developer collecting section to divide the used developer collecting section into at least two spaces; and a used developer storage section which stores the used developer, from which sludge has been filtered through the first sludge filtering section, wherein the used developer storage section communicates with the used sludge collecting section;

wherein the first sludge filtering section comprises at least one first porous plate, having at least one cell density.

16. The image forming apparatus as claimed in claim 15, wherein the at least two spaces include a first space located at a first position where the used developer removed by the cleaning section drops, and a second space located away from the first position.

17. The image forming apparatus as claimed in claim 16, wherein:

a bottom portion of the used developer collecting section positioned in the first space angles toward the second space; and another bottom portion of the used developer collecting section positioned in the second space angles toward a used developer discharge port, through which the used developer is discharged to the used developer storage section.

18. The image forming apparatus as claimed in claim 15, wherein the at least one first porous plate is formed from a first sponge plate having a predetermined cell density.

19. The image forming apparatus as claimed in claim 15, wherein the at least one first porous plate comprises:

a second sponge plate having a first cell density; and a third sponge plate having a second cell density, which is higher than the first cell density.

20. The image forming apparatus as claimed in claim 15, wherein:

the used developer cleaning unit further comprises a second sludge filtering section which secondarily filters the sludge contained in the used developer primarily filtered through the first sludge filtering section; and the second sludge filtering section is located upstream of the used developer discharge port.

21. The image forming apparatus as claimed in claim 20, wherein:

the second sludge filtering section comprises at least one second porous plate having at least one cell density; and the at least one cell density of the at least one second porous plate is equal to or higher than the at least one cell density of the at least one first porous plate.

22. The image forming apparatus as claimed in claim 21, wherein the at least one second porous plate is formed from a sponge plate having a predetermined cell density.

23. The image forming apparatus as claimed in claim 21, wherein the at least one second porous plate comprises:

a second sponge plate having a first cell density; and a third sponge plate having a second cell density, which is higher than the first cell density.

24. An image forming apparatus comprising:

an image forming unit having at least one photosensitive belt which forms a developer image using liquid developer;

a transfer unit which transfers the developer image formed on the photosensitive belt to a recording medium;

a fixing unit which fixes the developer image transferred to the recording medium; and a used developer cleaning unit which cleans used developer remaining on the photosensitive belt after the developer image is transferred to the recording medium, wherein the used developer cleaning unit comprises:

a cleaning section which removes used developer remaining on the photosensitive belt;

a used developer collecting section which collects the used developer removed by the cleaning section;

a first sludge filtering section which filters sludge contained in the used developer, wherein the first sludge filtering section is positioned in the used developer collecting section to divide the used developer collecting section into at least two spaces; and a used developer storage section which stores used developer, from which sludge has been filtered through the first sludge filtering section, wherein the used developer storage section communicates with the used sludge collecting section;

wherein a bottom portion of the used developer collecting section positioned in the first space is formed to downwardly decline toward the second space.

25. The image forming apparatus as claimed in claim 24, wherein the at least two spaces include a first space located at a first position where the used developer removed by the cleaning section drops, and a second space located away from the first position.

26. The image forming apparatus as claimed in claim 25, wherein another bottom portion of the used developer collecting section positioned in the second space is formed to downwardly decline toward a used developer discharge port, through which the used developer is discharged to the used developer storage section.

27. The image forming apparatus as claimed in claim 26, wherein:

the used developer cleaning unit further comprises a second sludge filtering section which secondarily filters the sludge contained in the used developer primarily filtered through the first sludge filtering section; and the second sludge filtering section is located upstream of the used developer discharge port.

* * * * *